(12) United States Patent
Komano

(10) Patent No.: US 7,895,517 B2
(45) Date of Patent: Feb. 22, 2011

(54) ELECTRONIC MUSICAL APPARATUS FOR DISPLAYING CHARACTER

(75) Inventor: Takeshi Komano, Iwata (JP)

(73) Assignee: Yamaha Corporation (JP)

( * ) Notice: Subject to any disclaimer, the term of this patent is extended or adjusted under 35 U.S.C. 154(b) by 1071 days.

(21) Appl. No.: 11/355,294

(22) Filed: Feb. 15, 2006

(65) Prior Publication Data

US 2006/0185500 A1    Aug. 24, 2006

(30) Foreign Application Priority Data

Feb. 17, 2005    (JP) .............................. 2005-040222

(51) Int. Cl.
G06F 17/27    (2006.01)

(52) U.S. Cl. .................... 715/251; 715/203; 715/234; 715/255; 715/269

(58) Field of Classification Search .................... None
See application file for complete search history.

(56) References Cited

U.S. PATENT DOCUMENTS

| | | | |
|---|---|---|---|
| 5,808,223 A | 9/1998 | Kurakake et al. | |
| 6,429,366 B1 * | 8/2002 | Terada | 84/645 |
| 6,515,211 B2 * | 2/2003 | Umezawa et al. | 84/477 R |
| 6,740,803 B2 * | 5/2004 | Brinkman et al. | 84/609 |
| 6,892,067 B1 * | 5/2005 | Sharma et al. | 455/419 |
| 6,965,770 B2 * | 11/2005 | Walsh et al. | 455/426.1 |
| 6,969,797 B2 * | 11/2005 | Brinkman et al. | 84/625 |

(Continued)

FOREIGN PATENT DOCUMENTS

JP    1195777 A    8/1989

(Continued)

OTHER PUBLICATIONS

Office Action dated Aug. 7, 2009 in connection with the corresponding Chinese Application No. 200610008518.5 (English Translation Provided).

(Continued)

*Primary Examiner*—Doug Hutton
*Assistant Examiner*—Andrew R Dyer
(74) *Attorney, Agent, or Firm*—Rossi, Kimms & McDowell LLP

(57) ABSTRACT

An electronic musical instrument loads, by a program process, automatic performance data representative of a musical piece and text data representative of characters into a RAM 24 to cause a musical tone signal generating circuit 14 to emit musical tone signals on the basis of the automatic performance data to reproduce the musical piece. In synchronization with the reproduction of the musical piece, the characters based on the text data are displayed on a display unit 13. The type, size, and color of the characters to be displayed are specified by a display mode control command contained in the automatic performance data. The total number of pages required when all the characters are sequentially displayed on the display unit 13 is calculated and stored for each of previously provided fonts. When any one of the fonts is selected, the stored total number of pages for the font is displayed. Pages to be displayed are switched in response to a text page control command contained in the automatic performance data. The present invention configured as above eliminates an inconvenience encountered in displaying characters in synchronization with reproduction of automatic performance data.

18 Claims, 11 Drawing Sheets

U.S. PATENT DOCUMENTS

| | | | |
|---|---|---|---|
| 7,020,635 B2* | 3/2006 | Hamilton et al. | 705/51 |
| 7,126,051 B2* | 10/2006 | Fay et al. | 84/609 |
| 7,313,591 B2* | 12/2007 | Eames et al. | 709/203 |
| 7,496,835 B1* | 2/2009 | Chen et al. | 715/234 |
| 2002/0054324 A1* | 5/2002 | Okada et al. | 358/1.15 |
| 2002/0140571 A1* | 10/2002 | Hayes et al. | 340/825.72 |
| 2002/0194355 A1* | 12/2002 | Morita et al. | 709/231 |
| 2003/0097571 A1* | 5/2003 | Hamilton et al. | 713/182 |
| 2003/0159566 A1* | 8/2003 | Sater et al. | 84/615 |
| 2004/0266337 A1* | 12/2004 | Radcliffe et al. | 455/3.06 |
| 2005/0010952 A1* | 1/2005 | Gleissner et al. | 725/46 |
| 2005/0033758 A1* | 2/2005 | Baxter | 707/100 |
| 2005/0109195 A1* | 5/2005 | Haruyama et al. | 84/645 |

FOREIGN PATENT DOCUMENTS

| | | |
|---|---|---|
| JP | 9-152876 A | 6/1997 |
| JP | 11024674 A | 1/1999 |
| JP | 2001142473 A | 5/2001 |
| JP | 2002-23774 A | 1/2002 |

OTHER PUBLICATIONS

Japanese Office Action dated Jul. 14, 2009 in connection with the corresponding Japanese Application No. 2005-040222. Partial Translation.

Japanese Office Action for corresponding JP2005-040222 (Partial Translation).

* cited by examiner (A)

(B)

(C)

ary piece. The present invention also relates to a com-
ELECTRONIC MUSICAL APPARATUS FOR DISPLAYING CHARACTER

BACKGROUND OF THE INVENTION

1. Field of the Invention

The present invention relates to an electronic musical apparatus that displays characters such as lyrics, chord progressions and tips on performance in synchronization with reproduction of a performance data string representative of a musical piece. The present invention also relates to a computer program run on the apparatus.

2. Description of the Related Art

As shown in Japanese Patent Laid-Open Publication No. 09-152876, there has been an apparatus that stores a lyric data string as well as a performance data string for reproducing of a musical piece and displays lyrics represented by the lyric data in parallel with reproduction of the performance data string. In this apparatus, display of lyrics is achieved through the use of performance data in which lyric data is embedded. In addition to the use of performance data embedding lyric data, display of lyrics can be achieved in this apparatus by storing a lyric data file separately from a performance data file and associating the filename of the lyric data file with that of the performance data file to allow this apparatus to read out appropriate lyric data associated with performance data to be reproduced.

In the above-described conventional apparatus, however, lyric data files are created in a specifically designed format in which "time data+lyric event data" is arranged in a time series. For users unfamiliar with such a specifically designed format, therefore, it is difficult and inconvenient to create lyric data files on a personal computer or the like.

SUMMARY OF THE INVENTION

To solve the above-described problem, the present invention adopts text format as a data format which makes it easy for users to create, on a personal computer or the like, a character data file representative of characters such as lyrics, chord progressions and tips on performance. However, the text format does not define the font for displaying characters (the type and size of characters), the color of characters, the number of pages, and the like, making it impossible to conduct the page switching in synchronization with performance data and the page jump to a certain position. An object of the present invention, therefore, is to provide an electronic musical apparatus and a computer-readable program applied to the apparatus whose usability is improved by resolving the above-described inconvenience encountered in displaying characters on the basis of text data in synchronization with the reproduction of a musical piece on the basis of performance data.

In order to achieve the above-described object, a configurational feature of the present invention lies in an electronic musical apparatus comprising a storage device for storing a performance data string representative of a musical piece for the purpose of reproducing thereof as well as storing text-formatted character data representative of characters associated with the performance data string for the purpose of displaying the characters, a reproducing portion for reading and reproducing the performance data stored in the storage device in accordance with the progression of the musical piece, and a display controlling portion for displaying on a display unit the characters represented by the character data stored in the storage device in synchronization with the reproduction of the performance data, wherein a page control command for switching pages of characters displayed on the display unit is included in the performance data, and the display controlling portion controls, in response to the page control command, switching pages of characters to be displayed.

In this case, the page control command may be a command for switching the display of characters on the display unit to the next page, to the previous page, or to the page containing a certain position. In the present invention, as a result, since the character data representative of characters are created in text file format, users are capable of creating character data on a personal computer or the like with ease. The present invention also realizes automatic page switching in accordance with the progression of reproduction of performance data.

Another feature of the present invention lies in that a display mode control command for controlling mode for displaying characters on the display unit is included in the performance data, and the display controlling portion controls mode for displaying the characters in response to the display mode control command. In this case, the mode for displaying the characters includes, for example, the type and size of characters defined by font, and the color of characters to be displayed. This feature realizes control of the mode for displaying characters on the display unit in associated relation with performance data.

As for the display mode control command, only one kind of the display mode control commands may be embedded at the top of performance data. Alternatively, the display mode control command may be embedded at some midpoint in performance data. The display mode control command embedded at some midpoint in performance data enables automatic switching of the type, size, color or the like of characters during performance in progress.

Still another feature of the present invention lies in an electronic musical apparatus wherein the display controlling portion displays, on a display unit, characters represented by character data stored in the storage device in any one of previously provided fonts in synchronization with reproduction of the performance data, the electronic musical apparatus comprising a page number calculating portion for previously calculating and storing, for the respective fonts, the total number of pages required when all the characters represented by character data stored in the storage device are sequentially displayed on the display unit in the respective fonts, and a page number display controlling portion for displaying on the display unit, when one of the fonts is selected, the total number of pages for the selected font calculated and stored by the page number calculating portion.

In this case, the page number calculating portion calculates and stores the total number of pages for the respective fonts when, for example, performance data and character data is written to the storage device. The calculation of the total number of pages may be immediately done for all the fonts on writing character data to the storage device. Alternatively, the total number of pages for the selected font may be calculated to display the characters on the first page, followed by calculation of the total number of pages for the other fonts. In other words, the page number calculating portion may previously calculate and store the total number of pages for the current font before the switching of fonts including the selection of the first font.

In this feature of the present invention configured as above, the page number calculating portion and the page number display controlling portion realize immediate display of the total number of pages without delay at switching of fonts, also eliminating the slowdown in execution of other processes including the display of characters caused by the calculation of the total number of pages.

A further feature of the present invention lies in an electronic musical apparatus further comprising a page switching operator for switching pages of characters to be displayed on the display unit, and a manual page switching controlling portion for switching pages to be displayed such that a page containing a certain position among the characters is displayed on the display unit in response to a predetermined manner of operation of the page switching operator. The above feature allows a user to display a page containing a certain position among the characters by a predetermined manner of operation of the page switching operator, realizing simple operation for displaying a page containing a certain position.

Furthermore, the present invention can be embodied not only as an invention of an electronic musical apparatus but also as an invention of a computer program and a method applied to the apparatus.

DESCRIPTION OF THE PREFERRED EMBODIMENT

Figure 1:
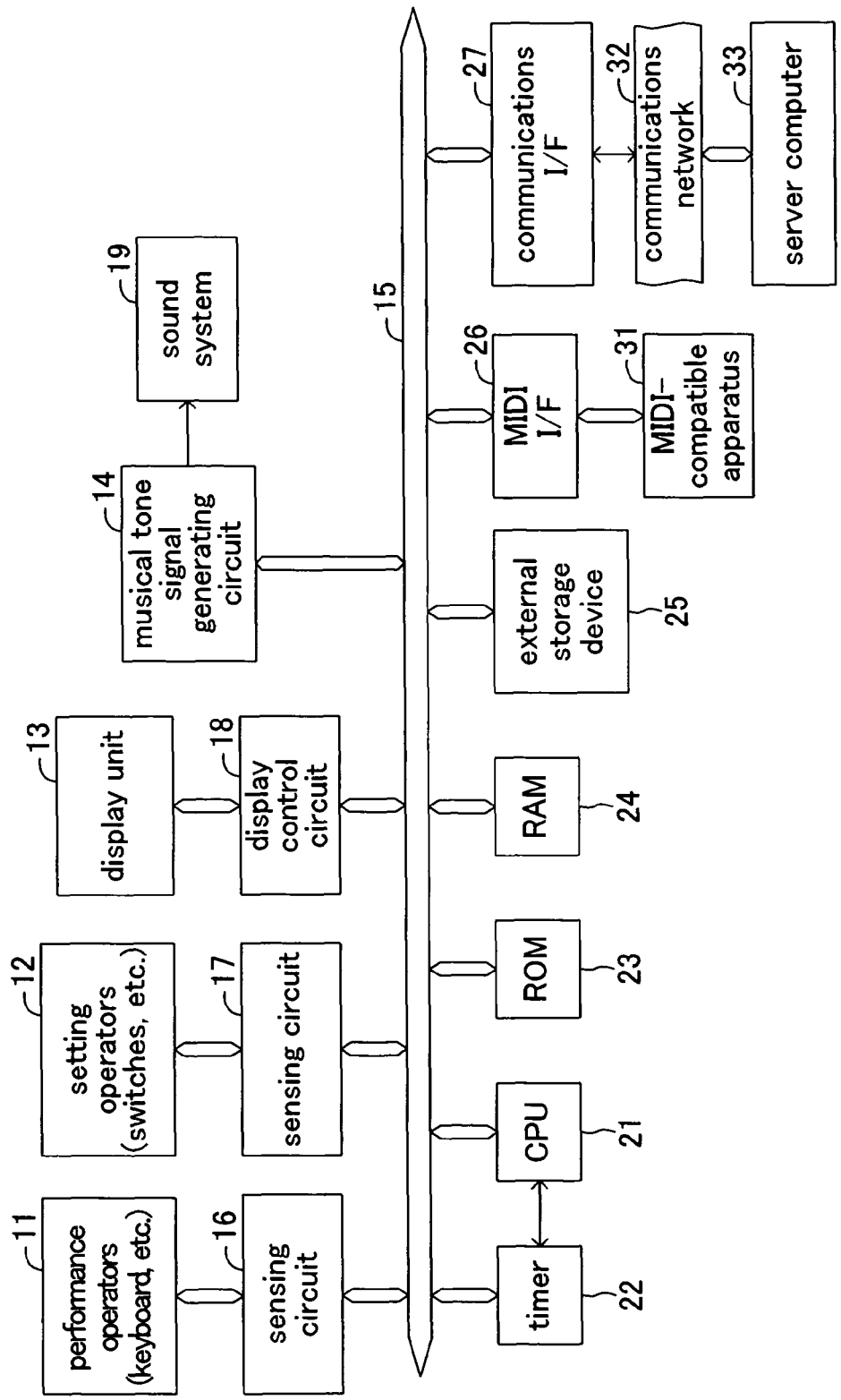
FIG. 1 is a block diagram showing the general arrangement of an electronic musical instrument according to an embodiment of the present invention.

An embodiment of the present invention will now be described with reference to the drawings. FIG. 1 is a block diagram schematically showing an electronic musical instrument applied as an electronic musical apparatus according to the present invention. The electronic musical instrument is provided with performance operators 11, setting operators 12, a display unit 13 and a musical tone signal generating circuit 14.

The performance operators 11 are formed of a plurality of performance operators (e.g., a plurality of keys) for specifying the pitch of musical tones to be generated. The operation of the respective performance operators is sensed by a sensing circuit 16 connected to a bus 15. The setting operators 12 are provided on an operating panel of the electronic musical instrument and formed of a plurality of setting operators for specifying the operating mode of respective parts of the electronic musical instrument. The operation of the respective setting operators is sensed by a sensing circuit 17 connected to the bus 15. The display unit 13 is configured by a liquid crystal display, a CRT or the like, displaying characters, numerals, graphics, etc. What is displayed on the display unit 13 is controlled by a display control circuit 18 that is connected to the bus 15.

The musical tone signal generating circuit 14, which is connected to the bus 15, generates musical tone signals on the basis of performance data supplied under the control of a later-described CPU 21, adds effects to the generated musical tone signals, and outputs the effect-added signals to a sound system 19. The sound system 19, which includes speakers, amplifiers and the like, emits musical tones corresponding to the musical tone signals.

The electronic musical instrument also includes a CPU 21, timer 22, ROM 23 and RAM 24 that are connected to the bus 15 and compose the main body of a microcomputer. The electronic musical instrument also has an external storage device 25, a MIDI interface circuit 26 and a communications interface circuit 27. The external storage device 25 includes various storage media such as hard disk HD and flash memory previously incorporated in the electronic musical instrument, and compact disk CD and flexible disk FD attachable to the electronic musical instrument. The external storage device 25 also includes drive units for the storage media to enable storing and reading of voluminous data and programs.

In the present embodiment, particularly, stored in the hard disk HD, flash memory or the like are various programs shown in FIGS. 2 to 8 as well as registration data files, automatic performance data files and text data files. The programs and the data are previously stored in the hard disk HD, flash memory or the like, are supplied from a compact disk CD, flexible disk FD or the like to the hard disk HD, flash memory or the like, or are supplied from a later-described MIDI-compatible apparatus 31 or a server computer 33 to the hard disk HD, flash memory or the like.

Figure 9:
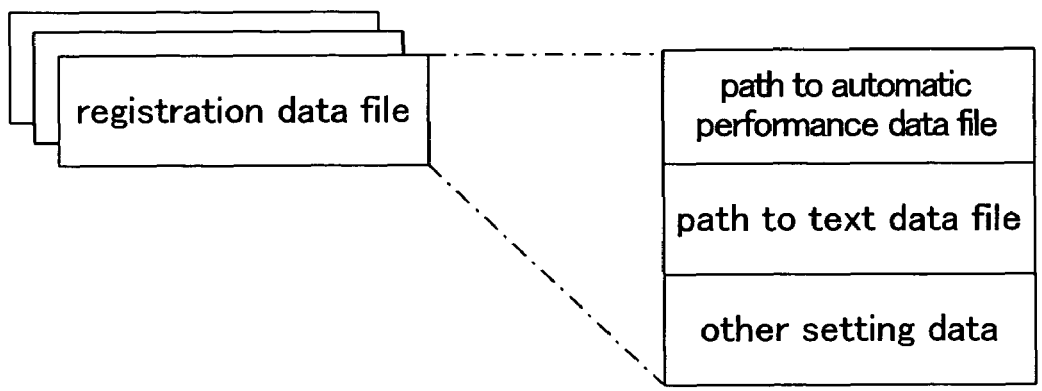
FIG. 9(A) is a diagram showing a data format of a registration data file.
FIG. 9(B) is a diagram showing a data format of an automatic performance data file.
FIG. 9(C) is a diagram showing a data format of a text data file.
Figure 9:
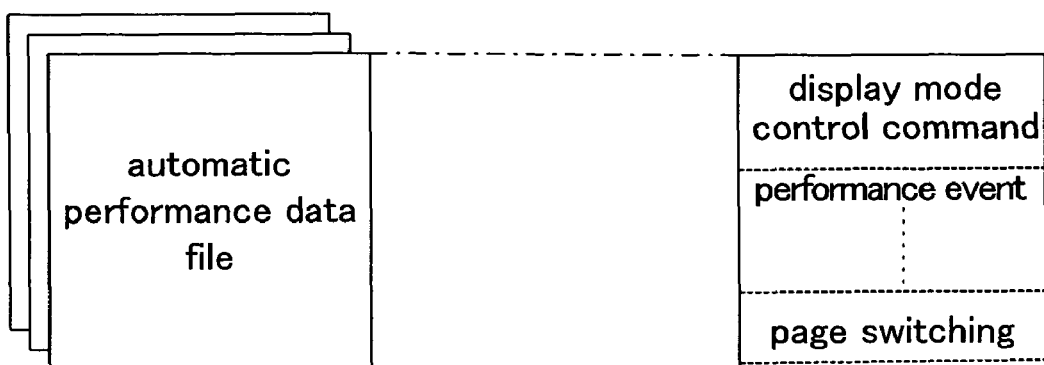
Figure 9:
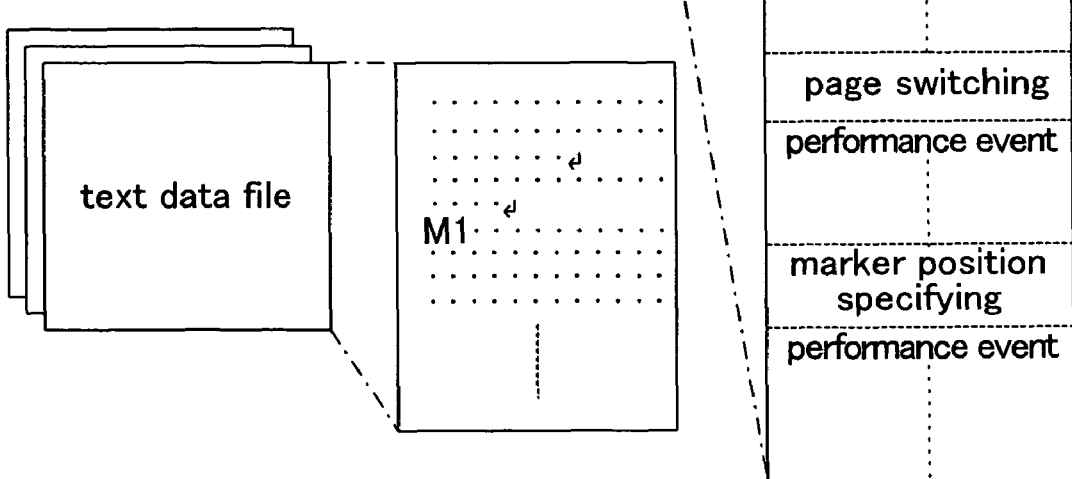

As shown in FIG. 9(A), each of the registration data files is formed of path data representative of paths to an automatic performance data file and a text data file, and other setting data specifying the tone color and the loudness of musical tone signals to be generated, the effect to be added to the musical tone signals to be generated, the tempo of automatic performance, etc. As shown in FIG. 9(B), each of the automatic performance data files is formed of one or more display mode control commands (font specifying data and display color specifying data), a plurality of performance event data sets, and a plurality of text page control commands (page switching commands and marker position specifying commands).

The display mode control command is placed basically at the top of a file. In some cases, however, the display mode control command is placed at a certain timing position of performance events. The font specifying data specifies the type and size of characters. The display color specifying data specifies the color of characters to be displayed. Provided for the present embodiment are six font types of 16-point monospaced font, 20-point monospaced font, 28-point monospaced font, 16-point proportional font, 20-point proportional font, and 28-point proportional font. The number of lines (the number of characters) to be displayed at a time on the display unit 13, i.e., the number of lines (the number of characters) per page varies among the font types. On the display unit 13, for instance, there can be displayed text of 9 lines per page in 28-point fonts (both in monospaced and proportional fonts), 12 lines per page in 20-point fonts (both in monospaced and proportional fonts), and 18 lines per page in 16-point fonts (both in monospaced and proportional fonts).

A performance event data set is formed of note event data for specifying the pitch of a musical tone signal to be generated and controlling start and stop of the generation of the musical tone signal, control event data for controlling the loudness, the tone color and the like of a musical tone signal, and other data. The performance event data is placed along with timing data in accordance with the progression of a musical piece (passage of time). Text page control commands are embedded in specified timing positions in the performance event data, while page switching commands instruct switching of pages in which characters are displayed on the display unit 13. Marker position specifying commands instruct switching of a currently displayed page to a page containing a marker position included in a later-described text data file. A text data file, as shown in FIG. 9(C), is formed of a character data string describing, in text format, characters such as lyrics, chord progressions and tips on performance suitable to be displayed during the reproduction of automatic performance data. In the character data string there is contained line break indicating data for indicating a line break and page break indicating data. In the character data string, furthermore, there are also stored markers of M1, M2 and so on each indicative of a character position to which the screen displayed on the display unit 13 is switched by the instruction for the display switching.

To the MIDI interface circuit 26 there is connected a MIDI-compatible apparatus 31 such as a different electronic musical instrument or a personal computer. The MIDI interface circuit 26 enables the electronic musical instrument to exchange various programs and data with the MIDI-compatible apparatus 31. The communications interface circuit 27 enables the electronic musical instrument to connect with the server computer 33 through a communications network 32 such as the Internet to receive and transmit various programs and data from/to the server computer 33.

Next explained will be the operation of the embodiment configured as described above. A user operates the setting operators 12 to start the main program. The main program is started at step S10 shown in FIG. 2. At step S11 the CPU 21 displays, on the display unit 13, a screen for selecting a registration data file to prompt the user to select a user's desired registration data file. If the user selects a registration data file, the CPU 21 reads the registration data file stored in the external storage device 25 and writes the registration data file into the RAM 24.

At step S12, the CPU 21 reads from the external storage device 25 an automatic performance data file specified by path data indicative of a path to the automatic performance data file, the path data being contained in the above-read registration data file, and writes the automatic performance data file into the RAM 24. At step S13, the CPU 21 reads from the external storage device 25 a text data file specified by path data indicative of a path to the text data file, the path data being contained in the above-read registration data file, and writes the text data file into the RAM 24. Due to these steps, the automatic performance data file and the text data file associated with the automatic performance data file are read as a set through the registration data file. Instead of reading from the external storage device 25, the registration data file, automatic performance data file and text data file may be read from the MIDI-compatible apparatus 31 through the MIDI interface circuit 26 or from the server computer 33 through the communications interface circuit 27 and the communications network 32.

After the process of step S13, the CPU 21 proceeds to step S14. At step S14 the CPU 21 writes and places character data contained in the text data file into a text buffer provided in the RAM 24 with consideration given to line break indicating data and page break indicating data. At step S15, the CPU 21 calculates, for all the fonts (6 types of fonts in the present embodiment), the total number of pages required to sequentially display from the top, on the display unit 13, single pages of characters represented by the character data placed in the text buffer. Since the number of characters displayable per page on the display unit 13 (multiplying the number of characters per line by the number of lines) varies among fonts, more specifically, character data is separated by pages, in consideration of line break indicating data and page break indicating data, to figure out the total number of pages.

At step S16, the CPU 21 then conducts an extracting process for extracting a display mode control command placed at the top of the automatic performance data file written in the RAM 24. The CPU 21 then determines at step S17 whether a display mode control command exists at the top of the automatic performance data file. If so, the CPU 21 gives "Yes" at step S17, and extracts at step S18 the first page of character data placed in the text buffer. The amount of character data to be extracted is determined according to the font specified in the display mode control command. At step S18, the CPU 21 then writes the extracted character data of the page to a display buffer provided in the RAM 24 in a display mode specified by the display mode control command. On the writing of the character data to the display buffer, the type and the size of characters are specified by the font specifying data, while the color of the characters to be displayed is specified by the display color specifying data.

If any display mode control command does not exist at the top of the automatic performance data file, on the other hand, the CPU 21 gives "No" at step S17, and extracts at step S19 the first page of character data placed in the text buffer. The amount of character data equivalent to a page is determined according to a default font. At step S19, the CPU 21 then writes the extracted character data of the page to the display buffer provided in the RAM 24 in a default display mode. On the writing of the character data to the display buffer, the type and the size of characters are specified on the basis of default settings, while the color of the characters to be displayed is specified on the basis of default settings. As for the display mode control command, only some kinds of the display mode control commands (e.g., the type and the size of characters) may be stored at the top of an automatic performance data file. In this case, the display mode to be specified by the other kinds of the display mode control commands (e.g., color of characters to be displayed) may be controlled on the basis of default settings. By a program process which is not shown, the CPU 21 then displays on the display unit 13 in cooperation with the display control circuit 18, characters represented by the character data written to the display buffer.

After the processes of steps S18, S19, the CPU 21 displays, at step S20, the current page number (basically, the first page)

on the display unit 13. At step S20 the CPU 21 also selects the total number of pages for the font specified by the display mode control command (font specifying data) or the default settings from among the above-calculated and stored total number of pages for all the fonts, and displays the selected total number of pages on the display unit 13. At step S20, also displayed on the display unit 13 is a title (i.e., title of a musical piece) contained in the registration data file, automatic performance data file or text data file written to the RAM 24.

Figure 10:
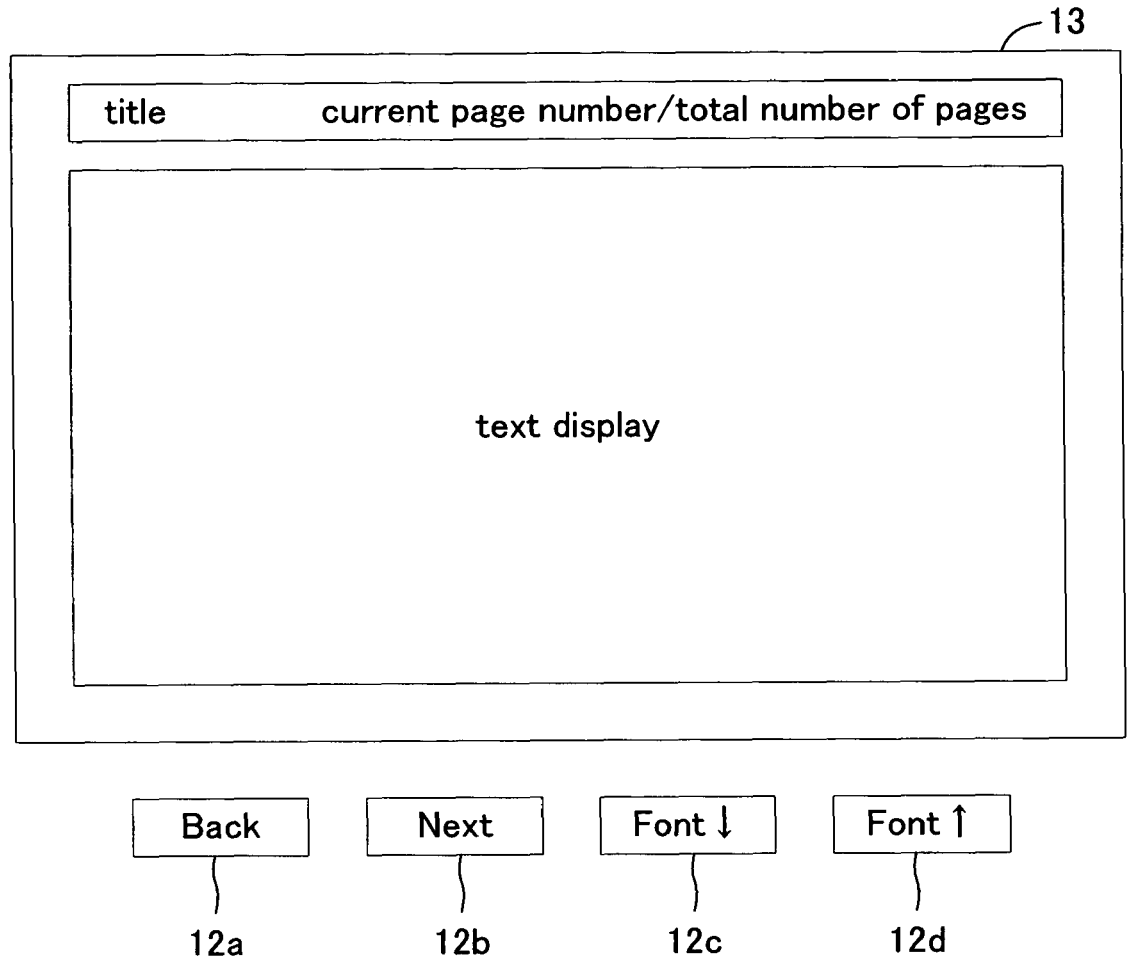
FIG. 10 is an example displayed on a display unit shown in FIG. 1.

Shown in FIG. 10 is a screen displayed on the display unit 13. Below the display screen of the display unit 13 there are located page-switching switches 12a, 12b and font-switching switches 12c, 12d that are part of the setting operators 12. The page-switching switch 12a is a switch for changing the currently displayed page back to the previous page. The page-switching switch 12b is a switch for advancing the currently displayed page to the next page. The font-switching switch 12c is a switch for changing the current font to the immediately preceding font of the previously provided fonts (6 kinds of fonts in the present embodiment). The font-switching switch 12d is a switch for changing the current font to the following font of the previously provided fonts.

The main program shown in FIG. 2 will be explained again. After the process of step S20, the CPU 21 specifies, at step S21 on the basis of other setting data contained in the registration data file written to the RAM 24, the tone color and the loudness of musical tone signals to be generated on the musical tone signal generating circuit 14, the effect to be added to the musical tone signals, and so on. Also specified at step S21 is the reproduction tempo of the automatic performance.

After the process of step S21, the CPU 21 repeatedly executes circulating processing formed of steps S22, S23. At step S22, the CPU 21 determines whether any of the setting operators 12 has been operated. If so, the CPU 21 gives, at step S22, "Yes" and proceeds to step S23 to execute a process corresponding to the operated setting operator.

Figure 3:
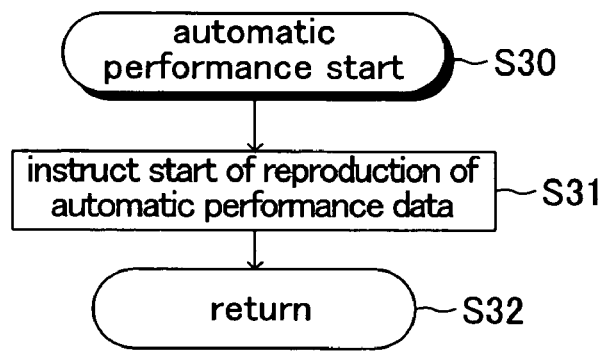
FIG. 3 is a flowchart of an automatic performance start program specified during execution of the main program.

Among the setting operators 12, if the setting operator for starting automatic performance is operated, the CPU 21 executes an automatic performance start program at step S23. As shown in FIG. 3, the automatic performance start program starts at step S30. At step S31, the start of the reproduction of automatic performance data is instructed, and this program terminates at step S32. The above-described instruction to start reproducing automatic performance data causes the CPU 21 to start repeatedly executing an automatic performance program shown in FIG. 4 at a periodicity corresponding to the above-specified tempo.

The automatic performance program starts at step S40. At step S41, the CPU 21 determines whether any performance event data or text page control command (page switching command and marker position specifying command) corresponding to a tempo count value that is counted up in accordance with the progression of a musical piece (i.e., passage of time) is contained in the automatic performance data file written to the RAM 24. In other words, the CPU 21 determines at step S41 whether the current timing is an event reproduction timing. If not, the CPU 21 gives "No" at step S41, and proceeds to step S45 to temporarily terminate the automatic performance program. If the current timing is an event reproduction timing, on the other hand, the CPU 21 gives "Yes" at step S41, and proceeds to step S42 to determine whether the event reproduction timing relates to performance event data or a text page control command.

If the event reproduction timing relates to performance event data, the CPU 21 transmits, at step S43, a control signal corresponding to the performance event data to the musical tone signal generating circuit 14 to control the generation of a musical tone signal. The musical tone signal generating circuit 14 starts generating the musical tone signal on the basis of the performance event data, or stops the currently generated musical tone signal. The thus-generated musical tone signal is emitted via the sound system 19. Through the above-described processes, a musical piece defined in the automatic performance data file written to the RAM 24 is automatically reproduced.

If the event reproduction timing relates to a text page control command, on the other hand, the CPU 21 executes, at step S44, a page process corresponding to the text page control command. If the text page control command is a page switching command, the CPU 21 executes, at step S44, a page switching command program. The page switching command program, which is described in detail in FIG. 5, starts at step S50.

After the start of the page switching command program, the CPU 21 determines at step S51 whether the page switching command is a font-specific command or a command commonly applied to all the fonts. Respective page switching commands will be described later in detail with examples taken. If the page switching command is a font-specific command, the CPU 21 gives "Yes" at step S51, and proceeds to step S52 to determine whether the page switching command agrees with the font currently displayed on the display unit 13. If so, the CPU 21 executes a process of step S53. If not, the CPU 21 proceeds to step S55 to terminate the page switching command program. If the page switching command is a command commonly applied to all the fonts, the CPU 21 gives "No" at step S51 to execute a process of step S53.

At step S53, the CPU 21 reads character data (text data) for the next page from the text buffer and writes the read data in the current display mode to the display buffer. In other words, the CPU 21 replaces the character data in the display buffer with the character data on the next page. Through the above-described process, characters currently displayed on the display unit 13 are replaced with the characters for the next page. After the process of step S53, the CPU 21 updates, at step S54, the current page number and the total number of pages displayed on the display unit 13. The CPU 21 then terminates the page switching command program at step S55.

Figure 11:
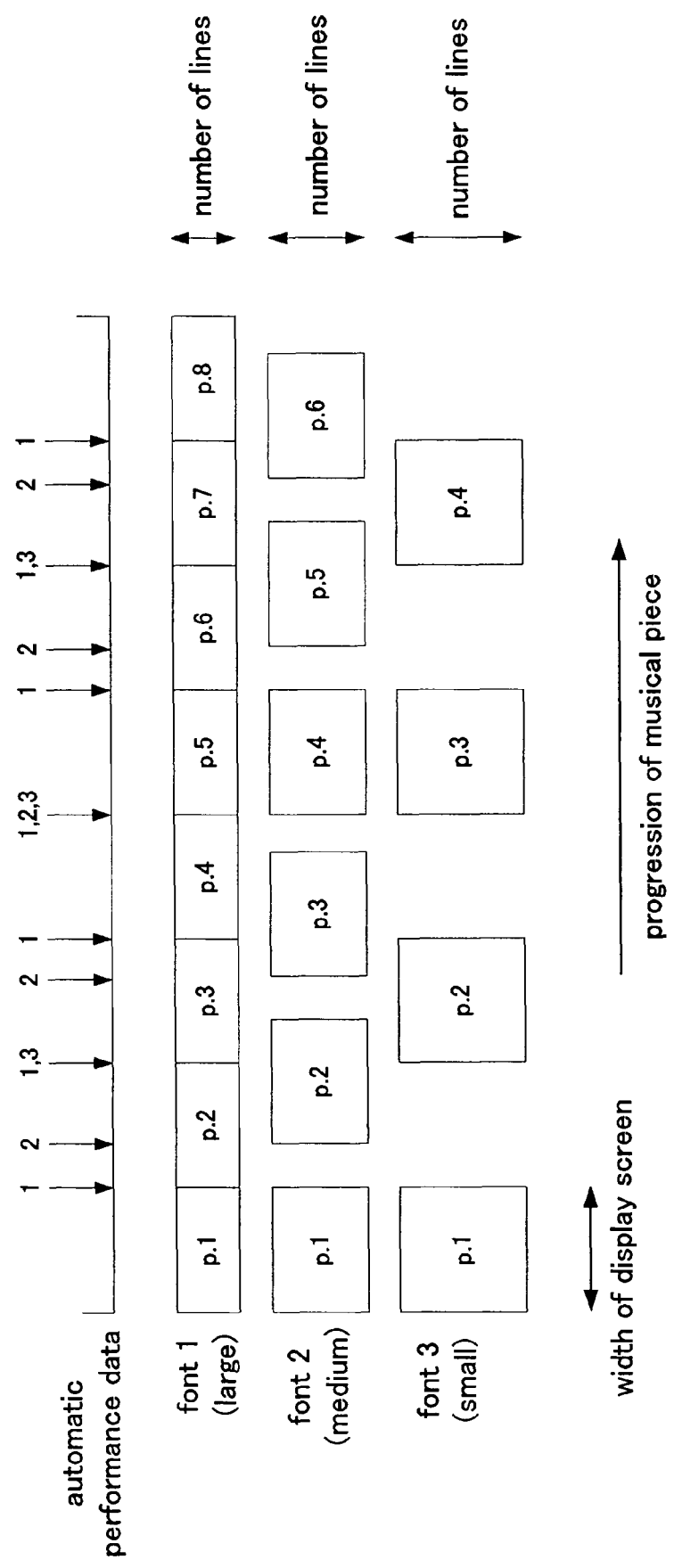
FIG. 11 is an explanatory drawing depicting an example of page switching commands embedded in automatic performance data.

Next explained, with reference to FIG. 11, will be the case in which the page switching command is a font-specific command. In this case, explained will be an example of three types of fonts: font 1 for specifying a large character, font 2 for specifying a medium-sized character, and font 3 for specifying a small character. As for boxes provided for the respective font types in FIG. 11, the lateral length indicates the width of a display screen, and the vertical length indicates the number of lines of characters displayable on the display screen. Indicated by "p.1, P.2, p.3 . . . " in the boxes is the page number counted from the top of the characters. In FIG. 11, furthermore, the page switching commands embedded in the automatic performance data are represented by "1", "2", and "3", being assigned a number according to their font. Since the size of a character decreases in order of fonts 1 to 3, the number of characters (the number of lines) displayable on the screen increases in this order. Therefore, intervals between the page switching commands embedded in the automatic performance data become longer in order of fonts 1 to 3. At a timing, "1", "2", and "3" as the page switching commands may be embedded separately. Alternatively, in a case where a plurality of page switching commands are embedded at a timing (e.g., "1" and "3", or "1", "2", and "3"), the plurality of commands may be represented as a page switching command.

If the above-described page switching commands are embedded in the performance data, the processes of steps S51, S52 cause the CPU 21 to respond only to the page switching commands applied to the currently specified font to switch the page display to the next page at step S53. As shown in FIG. 11, as a result, in accordance with the progression of a musical piece, i.e., the passage of time, pages on which characters are displayed are automatically switched one after another in synchronization with reproduction timings of the automatic performance data. Regardless of the font types to be specified, the above-described processes enable the display in which the appropriate number of characters are displayed on the display unit 13, ensuring appropriate page switching.

Figure 12:
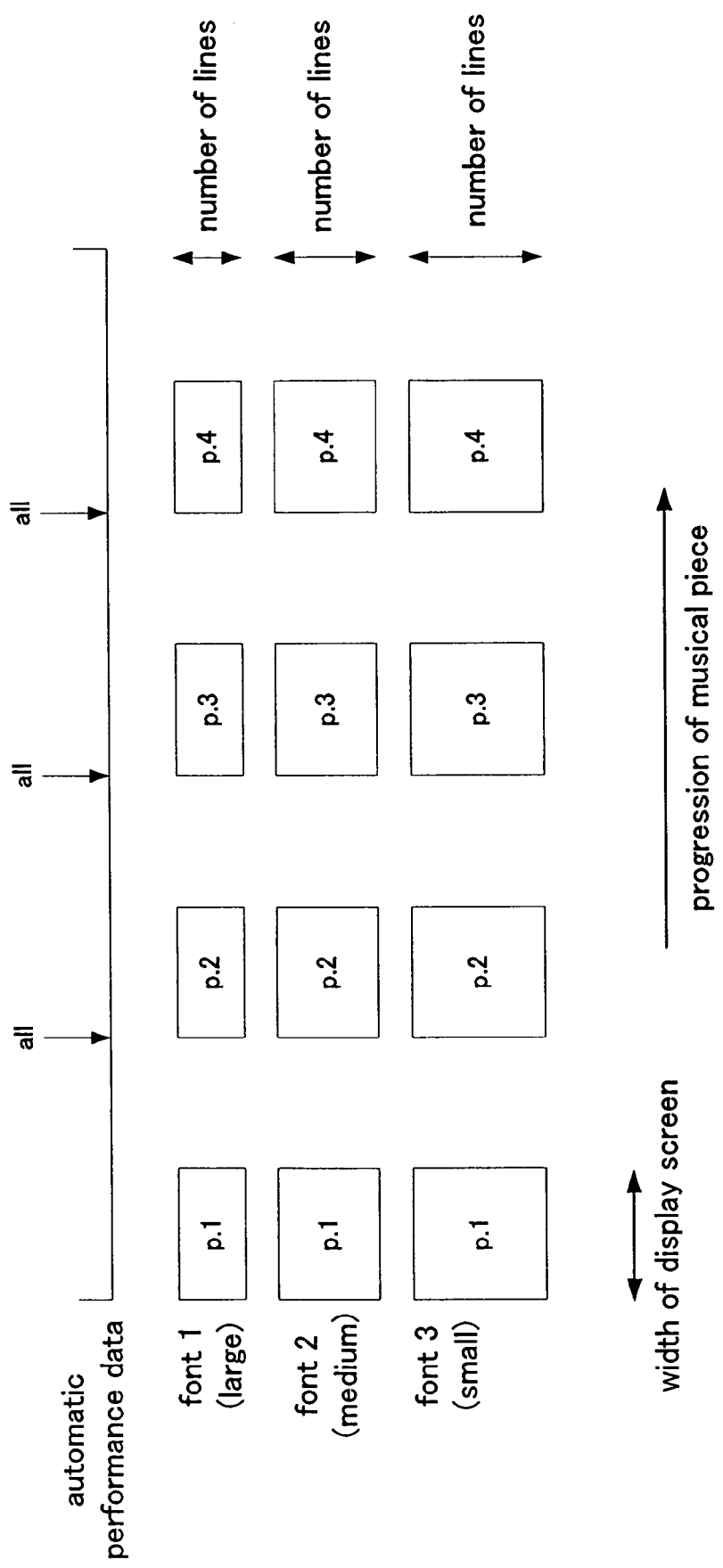
FIG. 12 is an explanatory drawing depicting another example of the page switching commands embedded in the automatic performance data.

Next explained, with reference to FIG. 12, will be the case in which the page switching command is a command commonly applied to all the fonts. Descriptions shown in FIG. 12 are the same as FIG. 11 except the page switching commands (represented by "all" in the figure) embedded in the automatic performance data. In the case of FIG. 12 as well, since the size of a character decreases in order of fonts 1 to 3, the number of characters (the number of lines) displayable on the screen increases in this order. However, intervals between the page break indicating data to be embedded in text data have to be adapted to font 1 that specifies the largest size of a character, since the page switching commands are commonly applied to the fonts 1 to 3. In other words, on the basis of font 1 by which the smallest number of characters are displayed on the screen, the page break indicating data is embedded in the text data. For instance, a page break indicating data set is embedded at every 9 lines or less.

If the page switching commands commonly applied to all the fonts are embedded in the performance data, the CPU 21 responds only to the page switching commands commonly applied to all the fonts to switch the current page to the next page at step S53. As shown in FIG. 12, as a result, in accordance with the progression of a musical piece, i.e., the passage of time, pages on which characters are displayed are automatically switched one after another at the same timing regardless of the font type in use in synchronization with reproduction timings of the automatic performance data. In this case, even a font that specifies a small character cannot display a large number of characters on a screen, however, the employment of such page switching commands applied to all the fonts allows a user to embed the page switching commands in automatic performance data without considering font types, facilitating user's task of embedding page switching commands.

In this case, furthermore, provided that a text data file is always displayed by a certain font, in other words, provided that a user requires to display the text data only by the certain font and will not switch the font to any other font, page switching commands that the user is required to embed are those applied to all the fonts only. In other words, what is required for the user is simply embedding an identical page switching command, facilitating the user's task of embedding the commands. In this case, text data files may be made or prepared under the condition that each of text data files is different.

Figure 4:
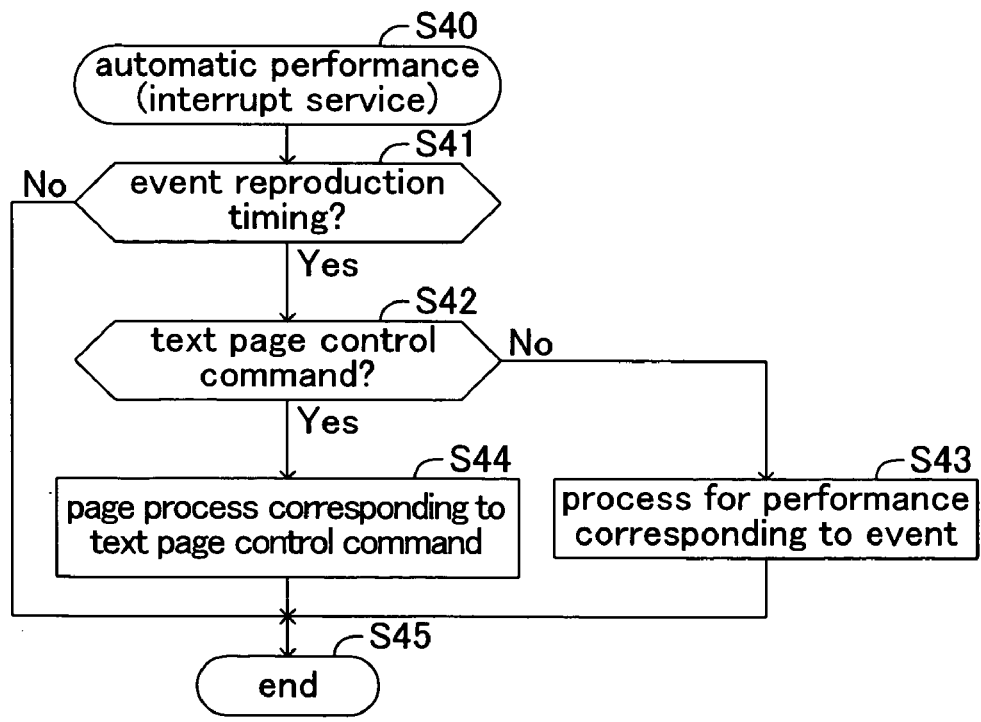
FIG. 4 is a flowchart of an automatic performance program repeatedly executed at fixed intervals by instruction made by the automatic performance start program to start automatic performance.

During the execution of the above-described automatic performance program, if the CPU 21 finds and reads out text page control data representative of a marker position specifying command at an event reproduction timing, the CPU 21 executes, at step S44 shown in FIG. 4, a marker position specifying command program. The marker position specifying command program, which is shown in detail in FIG. 6, starts at step S60.

After the start of this program, the CPU 21 searches the text buffer for a page containing markers M1, M2 or the like at step S61. At step S62, the CPU 21 reads character data (text data) corresponding to the found page from the text buffer and writes the read data in the current display mode to the display buffer. More specifically, character data stored in the display buffer is replaced with the character data corresponding to the page containing the markers M1, M2 or the like. By these processes, characters currently displayed on the display unit 13 are replaced with those corresponding to the page containing the markers M1, M2 or the like. After the process of step S62, the CPU 21 updates, at step S63, the current page number (page number containing the markers M1, M2 or the like) and the total number of pages displayed on the display unit 13. The CPU 21 then terminates the marker position specifying command program at step S64.

Figure 13:
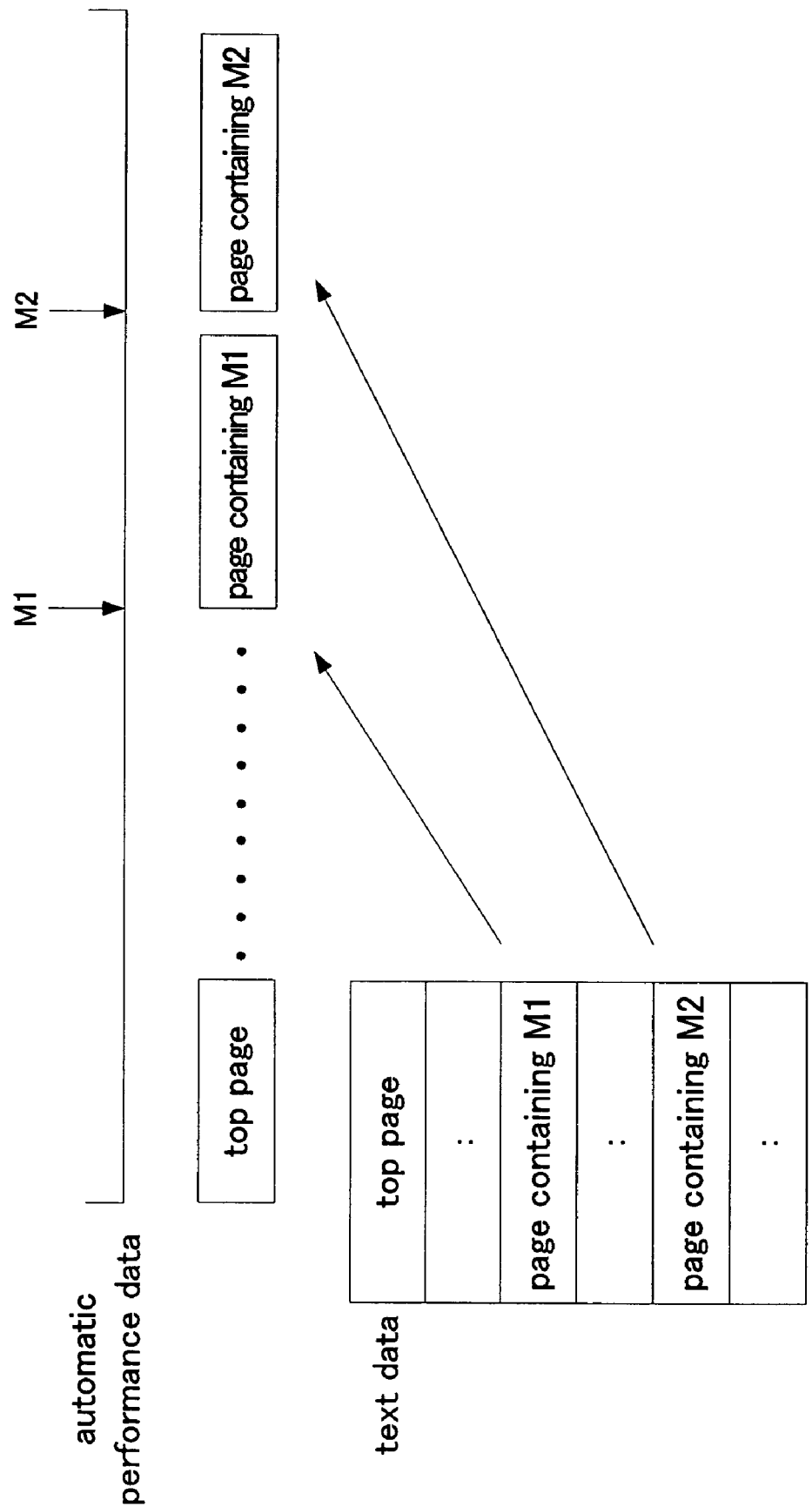
FIG. 13 is an explanatory drawing depicting an example of marker position specifying commands embedded in the automatic performance data.

Described in FIG. 13 is the switching of displayed characters to the marker position. In FIG. 13, more specifically, marker position specifying commands stored in specified timing positions in the automatic performance data file indicate the markers M1, M2, respectively. In this case, when characters represented by the character data in the text data file are sequentially displayed from the top page in accordance with the progression of a musical piece to finally read out the marker position specifying commands representative of the markers M1, M2, respectively, the pages containing the markers M1, M2 are displayed on the display unit 13 at the respective timings.

Next explained will be a process conducted in a case where the page-switching switches 12a, 12b or the font-switching switches 12c, 12d shown in FIG. 10 are operated. If the page-switching switches 12a, 12b is/are operated, the CPU 21 gives "Yes" at step S22 shown in FIG. 2 to execute a page-switching switch program at step S23. The page-switching switch program, which is shown in detail in FIG. 7, starts at step S70.

After the start of this program, the CPU 21 determines at step S71 whether either of the page-switching switches 12a, 12b alone has been operated. If it was a single operation of either of the page-switching switches 12a, 12b, the CPU 21 gives "Yes" at step S71 to execute a process of step S72. At the process of step S72, in a case where the page-switching switch 12a has been operated, the CPU 21 reads character data (text data) corresponding to the previous page from the text buffer, and writes the read data to the display buffer in the current display mode to replace the character data in the display buffer with the character data corresponding to the previous page. In a case where the page-switching switch 12b has been operated, the CPU 21 reads character data (text data) corresponding to the next page from the text buffer, and writes the read data to the display buffer in the current display mode to replace the character data in the display buffer with the character data corresponding to the next page. By these processes, characters displayed on the display unit 13 are replaced with those of the previous or next page.

If both of the page-switching switches 12a, 12b have been operated at the same time, the CPU 21 gives "No" at step S71 to search, at step S73, the text buffer for pages containing a marker. In this case, if text data contains a single marker, a page containing the marker is found. If text data contains a plurality of markers, a page containing a marker placed after (or before) the current position is found. After the process of step S73, the CPU 21 reads, at step S74, character data (text data) corresponding to the found page from the text buffer, and writes the read data to the display buffer in the current display mode. By these processes, the character data in the display buffer is replaced with the character data corresponding to the page containing a certain position specified by the marker to replace the characters displayed on the display unit 13 with those of a page containing the certain position. After the processes of steps S72, S74, the CPU 21 updates, at step S75, the current page number and the total number of pages displayed on the display unit 13, and terminates the page-switching switch program at step S76.

Figure 2:
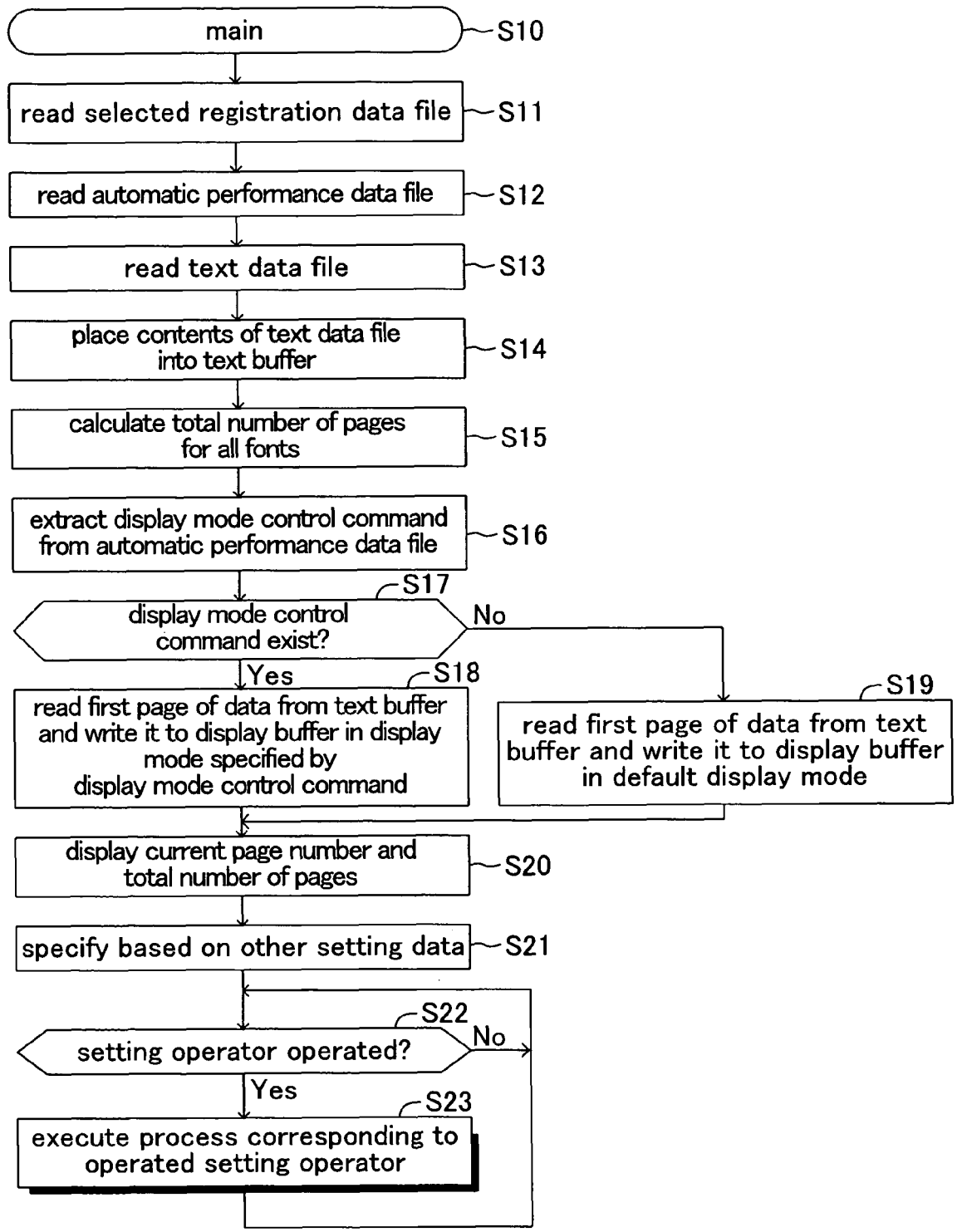
FIG. 2 is a flowchart showing a main program executed on the electronic musical instrument.

If the font-switching switch 12*c* or 12*d* is operated, the CPU 21 gives "Yes" at step S22 shown in FIG. 2 to execute a font-switching switch program at step S23. The font-switching switch program, which is shown in detail in FIG. 8, starts at step S80.

After the start of this program, the CPU 21 executes a process for switching the font at step S81. At this font switching process, in a case where the font-switching switch 12*c* has been operated, a font immediately preceding the current font is selected from among a plurality of fonts (6 types of fonts in the present embodiment) that have been previously provided and arranged in a specified order. In a case where the font-switching switch 12*d* has been operated, a font succeeding the current font is selected from among the plurality of fonts.

At step S82, the CPU 21 searches the text buffer for a page that contains the top line of the current page and is described in the above-selected font (i.e., the font to be used after the switching). At step S83, the CPU 21 reads character data (text data) corresponding to the found page from the text buffer, and then writes the read data to the display buffer in the display mode that applies to the above-selected font. By these processes, character data stored in the display buffer is replaced with character data that applies the above-selected font to replace characters displayed on the display unit 13 with those in the above-selected font. After the process of step S83, the CPU 21 also updates, at step S84, the current page number and the total number of pages displayed on the display unit 13. At step S85, the CPU 21 terminates the font-switching switch program. In this case, since the total number of pages has been already figured out and stored for each font at step S15 shown in FIG. 2, the total number of pages for the above-selected font will not be calculated in this program, but is simply selected to display on the display unit 13.

As apparent from the above operational descriptions, the present embodiment adopts the text format for character data representative of characters, enabling users to create character data with ease on a personal computer or the like. In the present embodiment, furthermore, on reading an automatic performance data file and a text data file, the total number of pages is figured out for a plurality of fonts by the process of step S15 shown in FIG. 2. Due to this process, even though switching of fonts is done by executing the font-switching switch program shown in FIG. 8 in response to user's operation of the font-switching switches 12*c*, 12*d*, the total number of pages is immediately displayed without delay. This process also eliminates the slowdown in execution of other processes including the display of characters caused by the calculation of the total number of pages.

Figure 5:
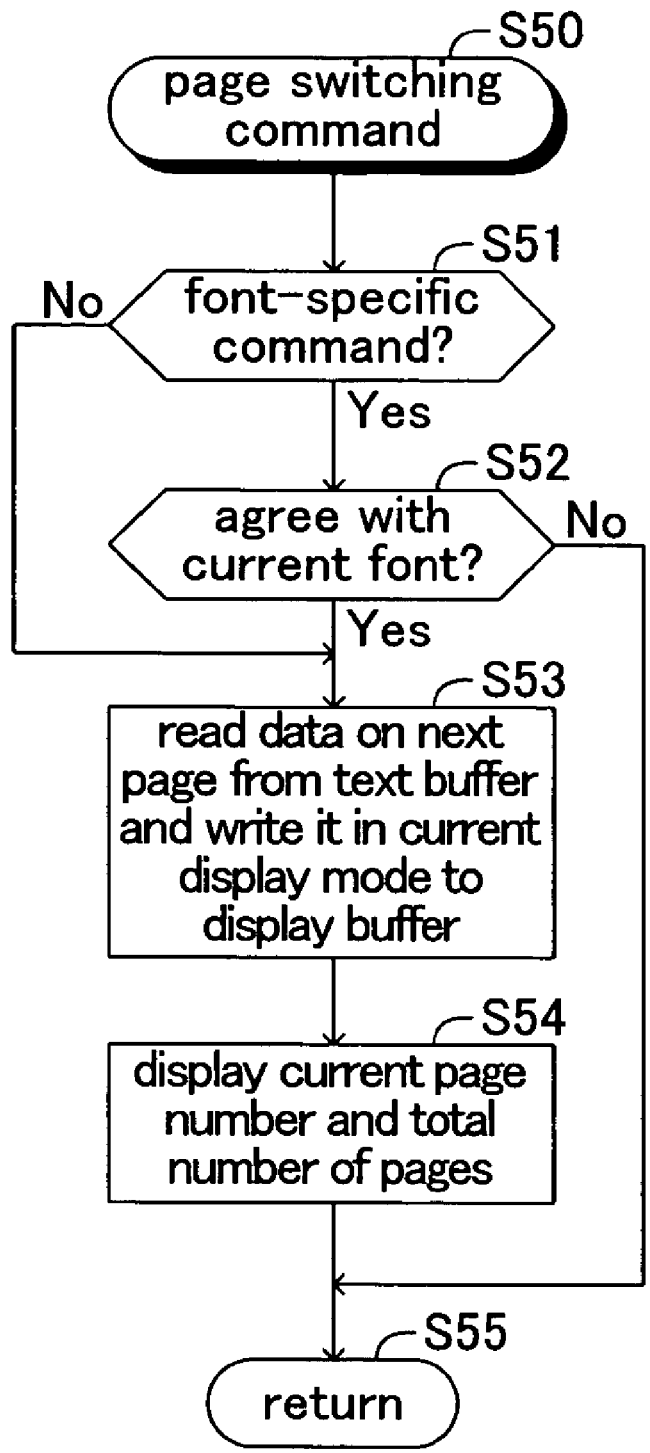
FIG. 5 is a flowchart showing a page switching command program specified during execution of the automatic performance program.
Figure 6:
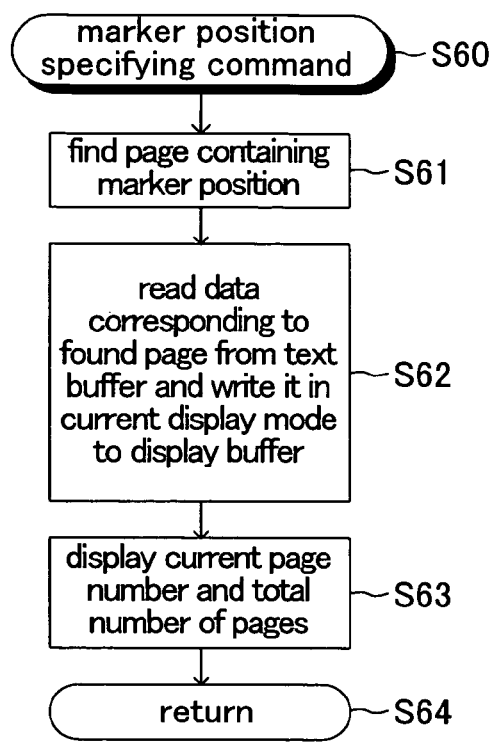
FIG. 6 is a flowchart showing a marker position specifying command program specified during execution of the automatic performance program.
Figure 7:
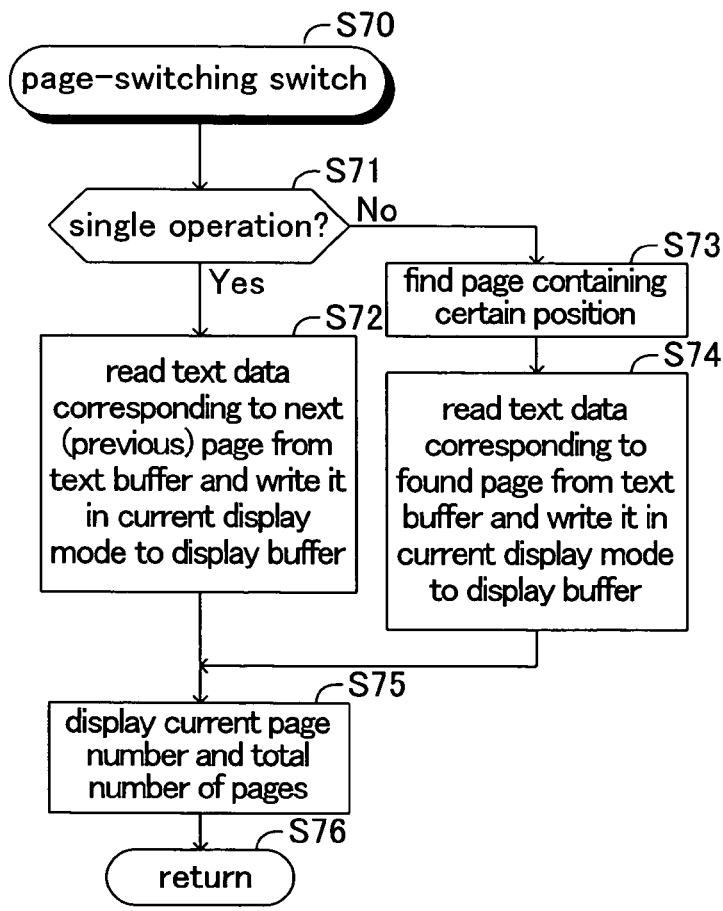
FIG. 7 is a flowchart showing a page-switching switch program specified during execution of the main program.
Figure 8:
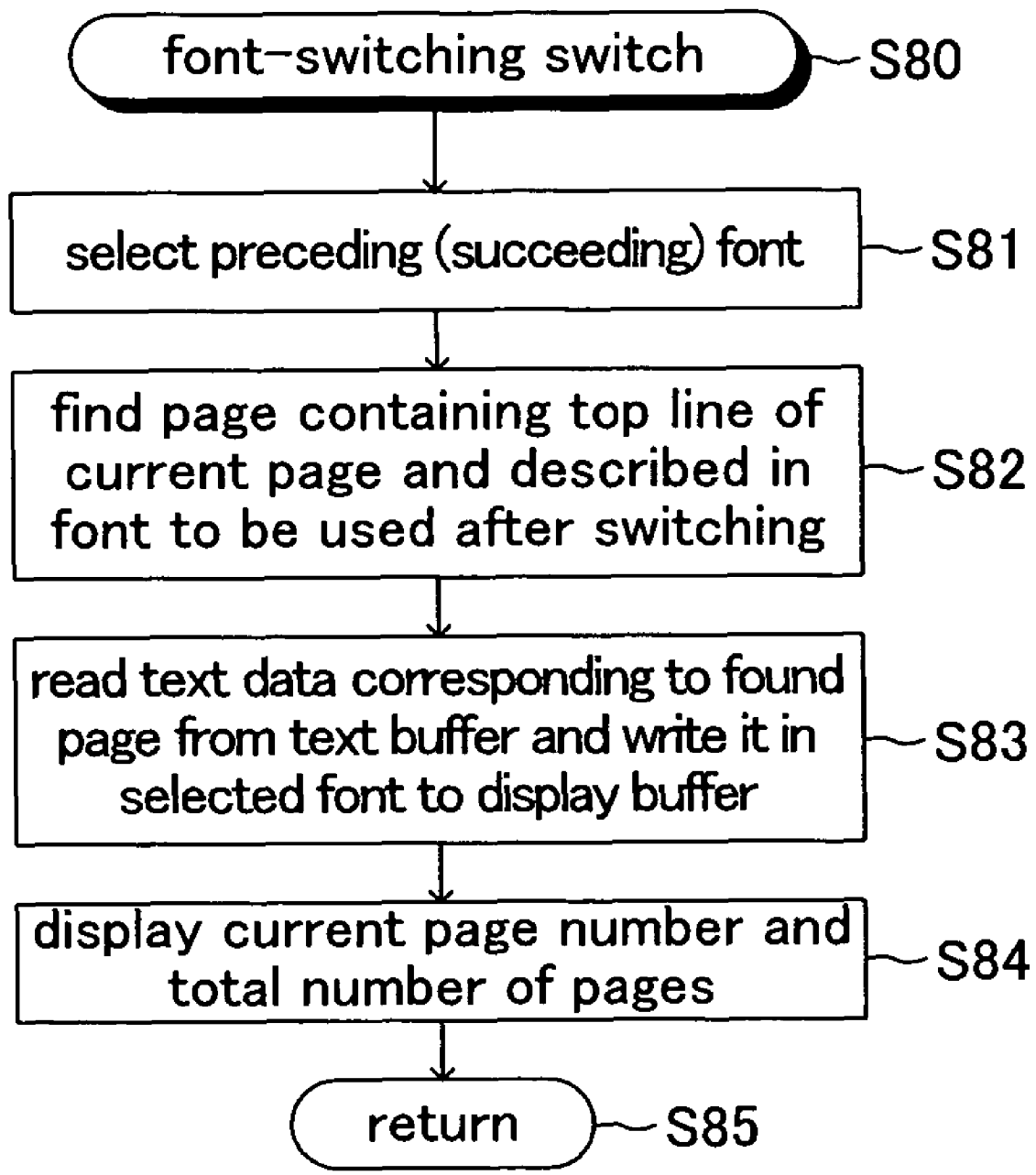
FIG. 8 is a flowchart showing a font-switching switch program specified during execution of the main program.

In the present embodiment, furthermore, by the execution of steps S16 to S18 shown in FIG. 2, the page switching command program shown in FIG. 5, and the marker position specifying command program shown in FIG. 6, the display of characters on the display unit 13 is controlled in accordance with display mode control command and text page control command embedded in performance data, resulting in the display of characters on the display unit 13 controlled in associated relation with the performance data. In addition, the execution of the page-switching switch program shown in FIG. 7 executed in response to the operation of the page-switching switches 12*a*, 12*b* enables manual switching of pages displayed on the display unit 13. By the simultaneous operation of the page-switching switches 12*a*, 12*b*, particularly, the present embodiment switches the current page displayed on the display unit 13 to a page containing a certain position among characters.

In carrying out the present invention, furthermore, it will be understood that the present invention is not limited to the above-described embodiment, but various modifications may be made without departing from the spirit and scope of the invention.

For instance, descriptions about the above-described embodiment do not include an example of automatic switching of the display mode control commands while a musical piece progresses with the passage of time. However, the display mode control commands may be embedded in performance data contained in an automatic performance data file along with event reproduction timing data in order to change the display mode (type, size and color of characters to be displayed) of characters displayed on the display unit 13 while a musical piece progresses with the passage of time. In this case, between the steps S41, S42 of the automatic performance program shown in FIG. 4 there are inserted processes similar to steps S16, S18, S20 of FIG. 2 and steps S82 to S84 of FIG. 8 to enable, on reading a display mode control command during the reproduction of automatic performance data, the switching of fonts (type and size of characters) and colors of characters, the replacement of displayed characters caused by the switching of fonts, and the update of the current page number and the total number of pages.

In the above-described embodiment, on reading an automatic performance data file and a text data file, the total number of pages is figured out for each of a plurality of fonts by the process of step S15 of FIG. 2. Instead of the above, however, calculation of the total number of pages for the font by which characters are actually displayed may be firstly done, followed by display of characters of the first page on the display unit 13 on the basis of the font. In this modification, the total number of pages is then figured out for the other fonts.

Described in the above embodiment was a case in which the page switching command causes the display of a page on the display unit 13 to proceed to the next page. In addition to the above-described page switching command, a page switching command for causing the display of a page to move back to the previous page may be employed. In this case, if the page switching command for moving back to the previous page is read out, executed at step S44 is a program process which causes the display of a page to move back to the previous page. In this program process, the process of step S53 of the page switching command shown in FIG. 5 is replaced with a process in which character data (text data) for the previous page is read out from the text buffer and written to the display buffer in the current display mode to replace character data stored in the display buffer with character data on the previous page. By this process, characters currently displayed on the display unit 13 are replaced with those for the previous page.

In the above embodiment, furthermore, the marker position specifying command finds a certain marker position to determine a page to display. Instead of the above, however, a plurality of the same markers may be embedded in a text data file so that the marker position specifying command causes the search for "next marker" or "previous marker".

In the above embodiment, furthermore, a simultaneous operation of the page-switching switches 12*a*, 12*b*, i.e., a certain operation, causes page switching to a marker position, i.e., to a certain position. Instead of the above, however, the certain operation may cause page switching to the top position or alternate switching between the marker position and the top position. Furthermore, the simultaneous operation of the page-switching switches 12a, 12b for conducting page switching to a certain position may be replaced with a long-duration continuous operation of either of the page-switching switches 12a, 12b. Instead of the above, furthermore, a dedicated switch for switching the display to a certain page may be provided. In the above embodiment, furthermore, the font-switching switches are used to select a font placed next or before the current font, however, the above embodiment may be modified such that a desired font is directly selected from among a plurality of fonts.

In the above-described embodiment, furthermore, the present invention is applied to an electronic musical instrument having keys as performance operators. In replacement for the keys, however, the present invention may be applied to an electronic musical instrument having mere push switches, touch switches or the like as performance operators for defining pitch. In addition to the electronic musical instrument, the present invention can be applied to other electronic musical apparatuses that are capable of reproducing automatic performance data and displaying characters such as karaoke apparatus, automatic performance apparatus, music amusement apparatus, personal computer, and portable remote terminal including mobile phone.

What is claimed is:

1. An electronic musical apparatus comprising:
a storage device storing (a) a text data file containing only text-formatted character data representative of characters to be displayed and (b) a performance data file containing (i) performance data representative of a musical piece for reproducing thereof and (ii) a display mode control command for controlling a display mode of displaying the characters represented by the character data, the display mode control command containing font specifying data that specifies all available fonts for displaying the characters represented by the stored character data;
a microprocessor coupled to a memory,
wherein the microprocessor is programmed to:
read the stored performance data file and reproduce the musical piece in accordance with the read performance data;
calculate in advance and store, for each of the all available fonts, the total number of pages required when all the characters represented by the character data contained in the stored text data file are displayed on the display unit in each of the all available fonts;
display on a display unit the characters represented by the character data contained in the stored text data file in accordance with the reproduction of the musical piece;
display on the display unit the total number of pages for the selected font, when one of the all available fonts is selected; and
control the display mode for displaying the characters in response to the display mode control command, which specifies the appearance of the characters, contained in the stored performance data file.

2. An electronic musical apparatus according to claim 1, wherein the display mode is the type and size of characters defined by font.

3. An electronic musical apparatus according to claim 1, wherein the display mode is the color of characters to be displayed.

4. An electronic musical apparatus according to claim 1, further comprising a manual display mode switching operator associated with the microprocessor for manually switching the display mode for displaying characters in response to operation of the manual display mode switching operator.

5. A non-transitory computer-readable storage medium storing a computer program for an electronic musical apparatus having:
a storage device storing (a) a text data file containing only text-formatted character data representative of characters to be displayed and (b) a performance data file containing (i) performance data representative of a musical piece for reproducing thereof and (ii) a display mode control command for controlling a display mode of displaying the characters represented by the character data, the display mode control command containing font specifying data that specifies all available fonts for displaying the characters represented by the stored character data;
a display unit for displaying characters; and
a controller,
wherein the computer program is executable by the controller to execute:
a reproducing step of reading the stored performance data file and reproducing the musical piece in accordance with the read performance data;
a calculating step of calculating in advance and storing, for each of the all available fonts, the total number of pages required when all the characters represented by the stored character data contained in the stored text data file are displayed on the display unit in each of the all available fonts;
a first display controlling step of displaying on a display unit the characters represented by the character data contained in the stored text data file in accordance with the reproduction of the musical piece;
a second display controlling step of displaying on the display unit the total number of pages for the selected font, when one of the all available fonts is selected; and
a display mode controlling step of controlling the display mode of displaying the characters in response to the display mode control command, which specifies the appearance of the characters, contained in the stored performance data file.

6. An electronic musical apparatus comprising:
a storage device storing (a) a text data file containing only text-formatted character data representative of characters to be displayed, (b) a performance data file containing (i) performance data representative of a musical piece for reproducing thereof, (ii) a page control command for switching pages of the characters represented by the character data to be displayed, and (c) a display mode control command containing font specifying data that specifies all available fonts for displaying the characters represented by the stored character data;
a microprocessor coupled to a memory,
wherein the microprocessor is programmed to:
read the stored performance data file and reproduce the musical piece in accordance with the read performance data;
calculate in advance and store, for each of the all available fonts, the total number of pages required when all the characters represented by the character data contained in the stored text data file are displayed on the display unit in each of the all available fonts;
display on a display unit the characters represented by the character data contained in the stored text data file in accordance with the reproduction of the musical piece;

display on the display unit the total number of pages for the selected font, when one of the all available fonts is selected; and control switching of pages of the characters to be displayed based on the page control command contained in the stored performance data file.

7. An electronic musical apparatus according to claim 6, wherein the page control command is a command for switching the display of characters on the display unit to the next page.

8. An electronic musical apparatus according to claim 6, wherein the page control command is a command for switching the display of characters on the display unit to the previous page.

9. An electronic musical apparatus according to claim 6, wherein the page control command further includes a command for switching the display of characters on the display unit to the page containing a certain position.

10. An electronic musical apparatus according to claim 6, further comprising a manual page switching operator associated with the microprocessor for manually switching pages of characters to be displayed on the display unit in response to operation of the manual page switching operator.

11. An electronic musical apparatus according to claim 6, further comprising a manual page switching operator associated with the microprocessor for manually switching pages of characters to be displayed on the display unit so that a page containing a certain position among the characters is displayed on the display unit in response to operation of the manual page switching operator.

12. An electronic musical apparatus according to claim 6, wherein the microprocessor calculates the total number of pages for the all available fonts immediately after storing the text data file and the performance data file to the storage device.

13. An electronic musical apparatus according to claim 6, wherein the microprocessor calculates the total number of pages for the selected font immediately after storing the text data file and the performance data file to the storage device and thereafter calculates the total number of pages for all other fonts.

14. An electronic musical apparatus according to claim 6, wherein the performance data includes a font specifying data for specifying the type and size of characters.

15. An electronic musical apparatus according to claim 6, further comprising a manual font switching operator associated with the microprocessor for manually switching the font of characters to be displayed on the display unit in response to operation of the manual font switching operator.

16. An electronic musical apparatus according to claim 6, wherein the performance data file includes the display mode control command.

17. A non-transitory computer-readable storage medium storing a computer program for an electronic musical apparatus having:

a storage device storing (a) a text data file containing only text-formatted character data representative of characters to be displayed, (b) a performance data file containing (i) performance data representative of a musical piece for reproducing thereof, (ii) a page control command for switching pages of the characters represented by the character data to be displayed, and (c) a display mode control command containing font specifying data that specifies all available fonts for displaying the characters represented by the stored character data;

a display unit for displaying characters; and a controller, wherein the computer program is executable by the controller to execute:

a reproduction step of reading the stored performance data file and reproducing the musical piece in accordance with the read performance data;

a page number calculating step of calculating in advance and storing, for each of the all available fonts, the total number of pages required when all the characters represented by the character data contained in the stored text data file are displayed on the display unit in each of the all available fonts;

a display controlling step of displaying on the display unit the characters represented by the character data contained in the stored text data file in accordance with the reproduction of the musical piece;

a page number display controlling step of displaying on the display unit the total number of pages for the selected font calculated and stored in the page number calculating step, when one of the all available fonts is selected; and a switching step of switching pages of the characters to be displayed based on the page control command contained in the stored performance data file.

18. A non-transitory computer-readable storage medium according to claim 17, wherein the performance data file includes the display mode control command.

* * * * *